US010945004B2

(12) United States Patent
Washino et al.

(10) Patent No.: US 10,945,004 B2
(45) Date of Patent: *Mar. 9, 2021

(54) HIGH-QUALITY, REDUCED DATA RATE STREAMING VIDEO PRODUCTION AND MONITORING SYSTEM

(71) Applicant: Hawk Technology Systems, LLC, Huntington Woods, MI (US)

(72) Inventors: Kinya Washino, Dumont, NJ (US); Barry H. Schwab, Bloomfield, MI (US)

(73) Assignee: HAWK TECHNOLOGY SYSTEMS, L.L.C., Huntington Woods, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/681,957

(22) Filed: Nov. 13, 2019

(65) Prior Publication Data
US 2020/0084484 A1    Mar. 12, 2020

Related U.S. Application Data

(63) Continuation of application No. 15/614,137, filed on Jun. 5, 2017, now Pat. No. 10,499,091, which is a
(Continued)

(51) Int. Cl.
*H04N 7/173* (2011.01)
*H04N 21/2343* (2011.01)
(Continued)

(52) U.S. Cl.
CPC ... *H04N 21/234354* (2013.01); *G11B 27/031* (2013.01); *G11B 27/034* (2013.01);
(Continued)

(58) Field of Classification Search
CPC .............. H04N 7/181; H04N 21/4223; H04N 5/23206; H04N 7/18; H04N 21/2187
See application file for complete search history.

(56) References Cited

U.S. PATENT DOCUMENTS 5,325,202 A    6/1994 Washino
5,450,140 A    9/1995 Washino
(Continued)

OTHER PUBLICATIONS

Abbott, et al.: Transmission Line Drivers and Receivers for TIA/EAI Standards RS-422 and RS-423, National Semi Conductor, Application Note 214, pp. 1-3, Aug. 1993.
(Continued)

*Primary Examiner* — Jason Salce
(74) *Attorney, Agent, or Firm* — Tarolli, Sundheim, Covell & Tummino LLP

(57) ABSTRACT

A multi-format digital video production system is capable of maintaining full-bandwidth resolution of subject material while providing professional quality editing and manipulation of images intended for digital television and other applications, including digital HDTV programs and specialized video monitoring applications. This allows emerging broadband video transmission media, including Internet broadcast schemes, to overcome existing technology limitations. The approach facilitates high-quality/large-screen video production and monitoring through the use of conventional broadband channels, including those which currently only exhibit bandwidths on the order of 4 Mbps. In formats utilizing substantially 24 fps progressive scan multiformat system, direct streaming is made possible from HDTV (16:9) high-quality data, thereby expanding market applications which require these higher levels of resolution, bits per pixel, and so forth. For example, these formats are employable to enable a video surveillance system to transmit images and video streams to a remote viewing device.

15 Claims, 3 Drawing Sheets

Related U.S. Application Data continuation of application No. 10/664,244, filed on Sep. 17, 2003, now abandoned.

(60) Provisional application No. 60/411,474, filed on Sep. 17, 2002.

(51) Int. Cl.

| | | |
|---|---|---|
| *G11B 27/031* | (2006.01) | |
| *H04N 21/854* | (2011.01) | |
| *H04N 5/268* | (2006.01) | |
| *H04N 7/01* | (2006.01) | |
| *H04N 21/2187* | (2011.01) | |
| *H04N 21/4143* | (2011.01) | |
| *H04N 21/462* | (2011.01) | |
| *H04N 21/472* | (2011.01) | |
| *H04N 21/4782* | (2011.01) | |
| *H04N 21/61* | (2011.01) | |
| *G11B 27/034* | (2006.01) | |
| *H04N 7/18* | (2006.01) | |
| *H04N 5/46* | (2006.01) | |

(52) U.S. Cl.
CPC ........... *H04N 5/268* (2013.01); *H04N 7/0112* (2013.01); *H04N 7/17318* (2013.01); *H04N 7/18* (2013.01); *H04N 21/2187* (2013.01); *H04N 21/234309* (2013.01); *H04N 21/234363* (2013.01); *H04N 21/4143* (2013.01); *H04N 21/4622* (2013.01); *H04N 21/4782* (2013.01); *H04N 21/47202* (2013.01); *H04N 21/6125* (2013.01); *H04N 21/854* (2013.01); *H04N 5/46* (2013.01)

(56) References Cited

U.S. PATENT DOCUMENTS

| | | |
|---|---|---|
| 5,450,247 A | 9/1995 | Schwab et al. |
| 5,625,410 A | 4/1997 | Washino et al. |
| 5,627,898 A | 5/1997 | Washino |
| 5,923,484 A | 7/1999 | Washino et al. |
| 5,982,418 A * | 11/1999 | Ely .................. G08B 13/19619 348/153 |
| 5,999,220 A | 12/1999 | Washino |
| 6,144,375 A | 11/2000 | Jain et al. |
| 6,201,896 B1 | 3/2001 | Ishikawa |
| 6,240,217 B1 | 5/2001 | Ercan et al. |
| RE37,342 E | 8/2001 | Washino et al. |
| 6,370,198 B1 | 4/2002 | Washino |
| 6,489,986 B1 | 12/2002 | Allen |
| RE38,079 E | 4/2003 | Washino et al. |
| 6,675,386 B1 | 1/2004 | Hendricks et al. |
| 6,698,021 B1 | 2/2004 | Amini et al. |
| 6,724,433 B1 | 4/2004 | Lippman |
| 6,920,179 B1 | 7/2005 | Anand et al. |
| 6,952,804 B2 | 10/2005 | Kumagai et al. |
| 7,106,364 B1 * | 9/2006 | Noro ...................... H04N 7/181 348/211.3 |
| 7,124,427 B1 | 10/2006 | Esbensen |
| 2001/0024233 A1 | 9/2001 | Urisaka et al. |
| 2001/0045988 A1 | 11/2001 | Yamauchi et al. |
| 2002/0035732 A1 | 3/2002 | Zetts |
| 2002/0072955 A1 | 6/2002 | Brock |
| 2002/0116716 A1 | 8/2002 | Sideman |
| 2002/0124122 A1 | 9/2002 | Hosokawa |
| 2002/0194054 A1 | 12/2002 | Frengut |
| 2004/0003411 A1 | 1/2004 | Nakai et al. |
| 2005/0086699 A1 | 4/2005 | Hahn et al. |

OTHER PUBLICATIONS

Pulnix, TM-1300 Progressive Scan High Resolution Camera, Jun. 1998, pp. 1-7.
Dr. Gorry Fairhurst, "MPEG-2 Overview", Jan. 2001, p. 1; Office Action dated Sep. 19, 2012 for U.S. Appl. No. 10/664,244.

* cited by examiner

HIGH-QUALITY, REDUCED DATA RATE STREAMING VIDEO PRODUCTION AND MONITORING SYSTEM

REFERENCE TO RELATED APPLICATION

This application claims priority from U.S. patent application Ser. No. 15/614,137 filed, 5 Jun. 2017, which claims priority from U.S. patent application Ser. No. 10/664,244, filed 17 Sep. 2003, which claims priority from U.S. Provisional Patent Application Ser. No. 60/411,474, filed 17 Sep. 2002, the entire content of which is incorporated herein by reference.

FIELD OF THE INVENTION

This invention relates generally to digital video and, more particularly, to a multi-format digital video production system capable of maintaining full-bandwidth resolution while providing professional quality editing and manipulation of images for various applications, including digital HDTV and specialized video monitoring.

BACKGROUND OF THE INVENTION

Traditional systems for video production either rely on uncompressed video signals (for example, SMPTE 4:4:4 or 4:2:2), standard compressed MPEG-2 4:2:2P@ML signals, or other signals that have undergone only minimal compression, such as the (approximately) 5:1 compression utilized for DVCPRO and DVCAM equipment by Panasonic and Sony. However, the bandwidth required for these high-quality signals still is too great for many broadcast and industrial applications, particularly those that require the level of detail available in HDTV images.

Due to the high-bandwidth demands of high-quality signals, typical distribution systems utilize only the highest quality levels for the head-end equipment and the first part of the signal distribution chain. Furthermore, because of network traffic due to multiple users (as for example, in a cable television distribution system), the last leg of the signal path utilizes a more highly compressed signal, to maximize the usage of the available bandwidth. In most cases, this requires that the original signal be decompressed, and then re-compressed at a much higher compression ratio, so that less bandwidth is required for the final portion of the path.

FIG. 1 is a diagram which illustrates the way in which conventional broadband transmission media are used. Progressive-scan devices are indicated at 102, and include 35 mm film 106, 24 frame-per-second (fps) cameras 108, and the inventive 24P camera system 110 described in further detail herein. Film production and television production are indicated with the vertical box 112, and Internet/broadband applications are shown at 120. Interlace scan devices 114 include 30 fps NTSC 116 and 25 fps PAL 118. Although suitable for certain film and television production applications, interlaced video 114, whether NTSC 116 or PAL 118, is inferior for Internet and broadband applications 120, since the delivered video quality is less than that possible with progressive display, regardless of compression. Even using a progressive format, however, film (35-mm) 106 and high-end 24 fps progressive camera inputs 108 are deficient in terms of quality, due to the need for high levels of compression later in the signal transmission path.

Accordingly, the need remains for an approach to video production and monitoring which allows the levels of quality that users have come to expect at their receiving terminals, while utilizing existing broadband media and other conventional technologies to optimize the signal storage, processing, and transmission path performance.

SUMMARY OF THE INVENTION

This invention resides in a multi-format digital video production system capable of maintaining the full-bandwidth resolution of the subject material, while providing professional quality editing and manipulation of images intended for digital television and for other applications, including digital HDTV programs and specialized video monitoring applications.

Broadly, this invention allows emerging broadband video transmission media, including Internet broadcast schemes, to overcome existing technology limitations. In the preferred embodiment, for example, the approach facilitates high-quality/large-screen video production and monitoring through the use of conventional broadband channels, including those which currently only exhibit bandwidths on the order of 4 Mbps. In more specific examples, in formats utilizing a 24 fps progressive scan multi-format system, direct streaming is made possible from HDTV (16:9) high-quality data, thereby expanding market applications which require these higher levels of resolution, bits per pixel, and so forth.

This system, now known as the "Direct Stream Cinema System," is based on optimizing the entire signal path, utilizing 4:2:2 color processing and bit rates typically in the range of 2-6 Mbps. It begins with digitizing and compressing the output of the optical pickup and graphics processor (including appropriate processing, such as noise reduction and resolution enhancement) and carries through the processing circuitry to the receiving terminal device at the user end of the transmission chain. Signal quality is preserved throughout the process, by eliminating the need to decompress a lower-compression signal from a camera, video recorder, or other source device for editing or other purposes, and then re-compressing the signal at a much higher rate for transmission purposes.

A high-quality, reduced-data-rate digital video system according to a preferred embodiment includes a source of a streaming video program having a progressive-scanned image with a frame rate of less than substantially 24 fps; a video server in communication with the source for storing the program; and one or more computers in network communication with the video server for locally displaying the program or portions thereof.

In a "direct stream" implementation the locally displayed program or portions thereof are in the same format as the streaming video program received form the source. The system and method may further include a personal-computer-based control of the camera/input device, monitor for the streaming video program received from the source, or other PC-based capabilities. The streaming video program may be received through a network connection, and the video server includes one or more of the following for storing the program: a micro-disk, portable HDD, memory-stick, optical storage, or magneto-optical storage.

DETAILED DESCRIPTION OF THE INVENTION

Figure 1:
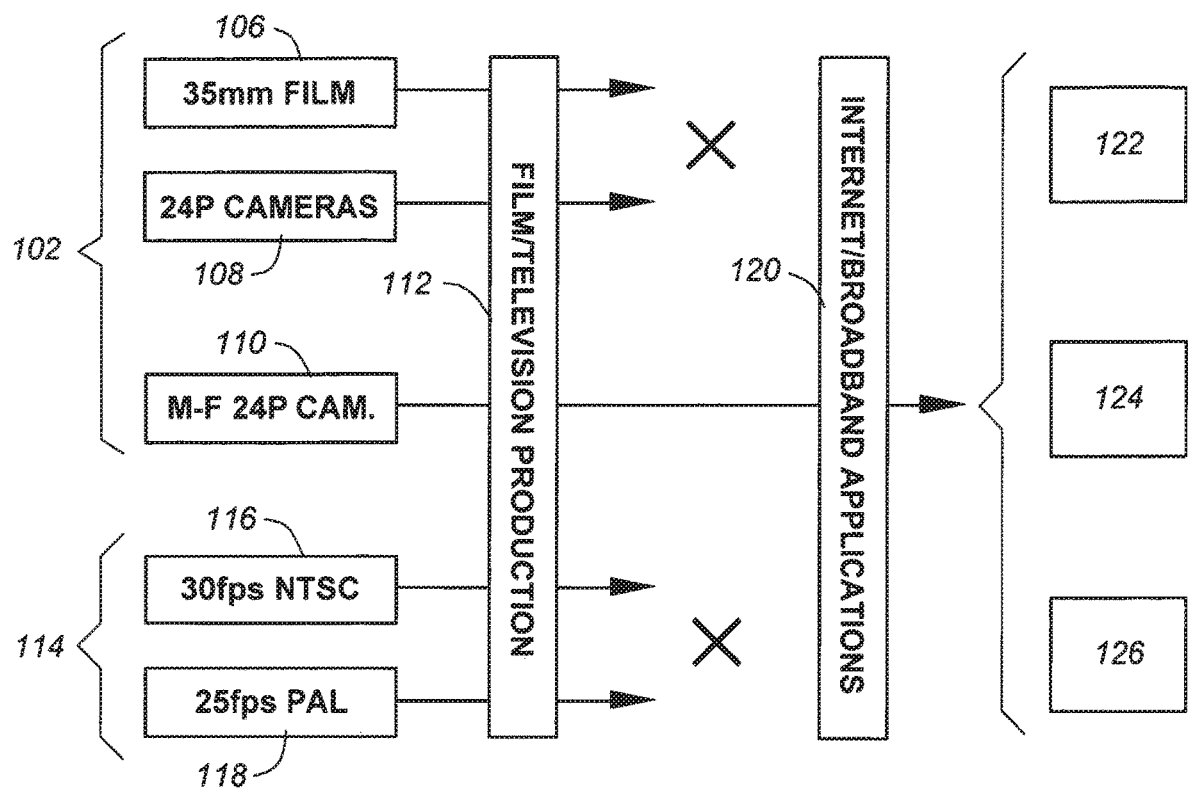
FIG. 1 is a diagram which illustrates the way in which conventional broadband transmission media are used, showing how high compression and interlaced video are poor choices for higher quality applications.

This invention overcomes the limitations of the existing art by providing a video production/monitoring capability capable of transmitting HDTV (16:9) quality video utilizing existing broadband bandwidths of [such as 4 Mbps (1024×576 pixels) or greater], thereby overcoming the traditional problem of conserving bandwidth while preserving quality.

The "Direct Stream Cinema System" preferably utilizes a 24 fps progressive camera format which, through the use of proprietary multi-format production techniques (110), facilitates Internet and broadband applications, including streaming services 122, Internet TV, video monitoring/security 124, and 35 mm/HDTV/DVD output capabilities 126. The approach does not require an HDTV quality video camera or recording, however, but nevertheless facilitates HDTV quality, direct video monitoring, off-line editing, and other capabilities at a great reduction in total system cost.

With respect to streaming applications, the video data may be transmitted directly to a central server through a network environment, resulting in both a comparatively small capacity storage requirement and also in other advantages over existing approaches. In one disclosed example, HDTV quality video with an aspect ratio of 16:9 is achieved, having a horizontal resolution of 1024×576, with the potential for up-conversion to 1920×1080. This resolution, equivalent to a 42-inch plasma display, is accomplished with a data rate of 4 Mbps, more or less, enabling recording to occur at 2 GBytes/hr, whereas current HDTV requires more than 100 GBytes/hr. Various video formats are possible through the use of proprietary multi-format progressive systems and frame rates, which may vary up to 24 fps (or greater) in the preferred embodiment.

Newer media players, such as Microsoft's new "Corona" technology, which is scheduled to be released with the latest version of the Windows Media Player (Series 9), are aimed at signal distribution systems utilizing a data rate of 6 Mbps, using MPEG 4 and other comparable compression techniques. However, such technology also provides for bit rates in the range of 2-4 Mbps, being directed towards applications such as archiving, streaming video, and off-line viewing. At these data rates, it is possible to store 100 hours of video in only 180 GB of storage [(100 hr)×(3600 sec/hr)×(4 Mbps)/(8 b/B)].

Figure 2:
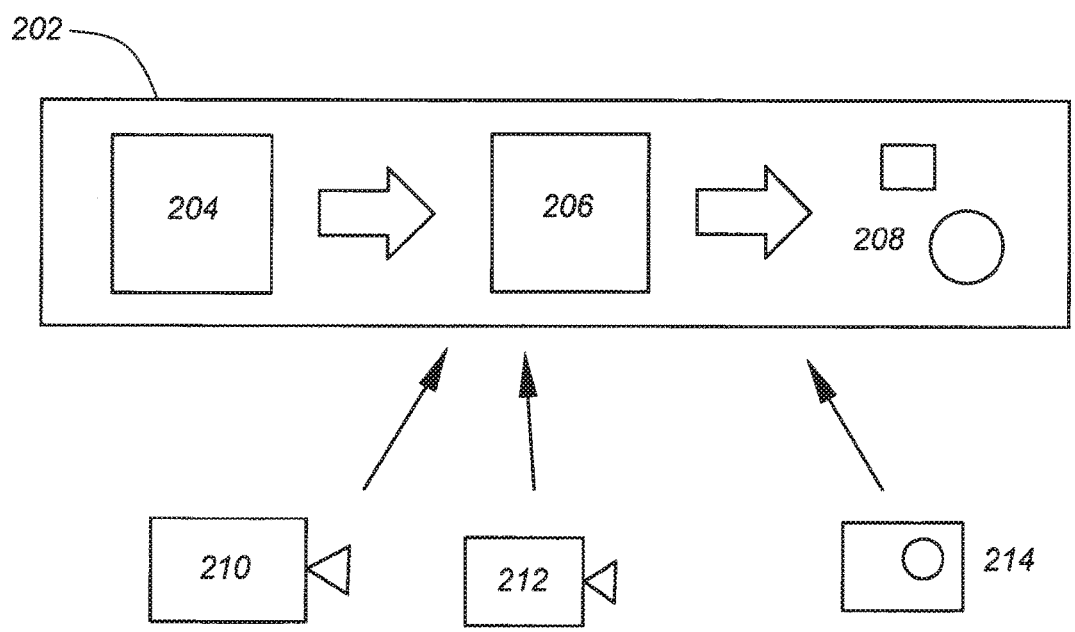
FIG. 2 is a diagram which shows the concepts behind the various versions of the "Direct Stream Cinema" systems.

FIG. 2 discloses three of the many potential implementations of the "Direct Stream Cinema" system: Professional cameras and Camcorders 210, Consumer Camcorders 212, and Digital-Still-Camera recorders 214. According to the invention, the entire process 202 may use digital component (4:2:2) processing, preferably based upon a 3-CCD 24P input 204, through graphic processing and compression at 206, to storage 208, whether on a hard drive, digital video disk, memory card, or other medium. Video stored in this manner is suitable for on-line editing applications, using PC plug-in hardware cards from companies like Matrox (Perphelia) and ATI (Radion 9200/9800), Nvidia (GeForce FX). However, these conventional off-the-shelf-types of cards require modification, so that they would be equipped with true DV or SDI digital video outputs, thereby providing compatibility with both HDTV and standard NTSC formats, including analog, Y-C component formats, and composite video outputs. In addition, software packages such as Adobe Premier 6.5, and Ulead MediaStudio 7, when utilized with a high-end PC (3 GHz or higher processing speed), are capable of providing sophisticated editing capabilities.

The resulting signal can be stored, in an AVI format, for example, on a hard disk drive. Currently, these PC cards only are being used for SDTV, but in the future, they will be capable of HDTV recording, and for specialized industrial applications; for HDTV applications, a new decoder board would be used.

The preferred storage and distribution format according to the invention is 1024×576@24 fps. Compression ratios of 100:1 are practical for SDTV, and 400:1 for HDTV. In addition, the system is scalable, for example, to the following:

200 Kbps@1 fps
500 Kbps@3 fps
1 Mbps@6 fps
2 Mbps@12 fps
4 Mbps@24 fps

Comparisons of the output quality of a variety of PC-video display cards utilizing both interlaced and progressive signals and also frame-rate/standards-conversion indicate a need to optimize the signal processing. For conversions from interlaced PAL signals to NTSC, these cards produce outputs with noticeable frame skipping and jumping. However, from a progressive PAL signal (i.e., greater than 50 fps progressive), the severity of artifacts is greatly reduced. Newer PC graphics cards produce significantly better results, which suggests that they may have adopted the frame-rate conversion techniques disclosed in U.S. Pat. No. 5,999,220, entitled "Multi-Format Audio/Video Production System with Frame Rate Conversion" and U.S. Pat. No. 6,370,198B1, entitled "Wide-band Multi-Format Audio/Video Production System with Frame Rate Conversion," the entire content of both being incorporated herein by reference.

In preferred embodiments, signals at the head-end of a signal distribution system are converted to progressively scanned signals. A frame rate of 24 fps preferably is employed, in order to optimize the utilization of the available bandwidth. In the next step, the signals are compressed to create a data stream at 2-4 Mbps (for 1024×576@24 fps) or 4-6 Mbps (for 1280×720@24 fps. These signals may be stored for subsequent transmission to receiving terminal equipment (such as PCs, cable boxes, personal video recorders, display monitors, or other terminal equipment), or immediately transmitted over a signal distribution system, which may be wired, wireless, satellite, or other medium, including physical media such as CD-ROMs, DVDs, etc.). This receiving terminal equipment may be located at multiple remote sites, may be located at multiple sites within a single facility, or may be configured as a combination of local and remote sites.

In an alternative embodiment, signals may be received from multiple sources, including one or more remote sources, and are collected at a central location for viewing, storage, or both. The signals preferably are transmitted to the central site as compressed, progressively-scanned streaming video signals, employing data rates in the range of 2-4 Mbps. As in other embodiments, 24 fps is preferably used, although the frame rate may be greater or less, may be variable or fixed, and may be modified under control of a local operator, or may be modified automatically in response to a predetermined set of criteria, utilizing sensors at the physical location of the camera or signal source, or via remote control from a central site, either under control of an operator, or automatically in response to a predetermined set of criteria. The source signal frame rate and image size may be different for each source signal, and the frame rate and image size of a source signal in the format stored need not be identical to the frame rate and image size in the format displayed.

Currently, ½-inch 3-CCD cameras are available for less than $10,000, and ⅓-inch 3-CCD cameras are available for approximately $5,000. As such, it is already practical and economical to implement this type of system for a range of commercial/industrial applications, for example:

Airport security

Monitoring of remote natural areas, such as forests

Auto crash testing

Public building (Court, Government office, School) security

Hospital security

Educational/instructional

Figure 3:
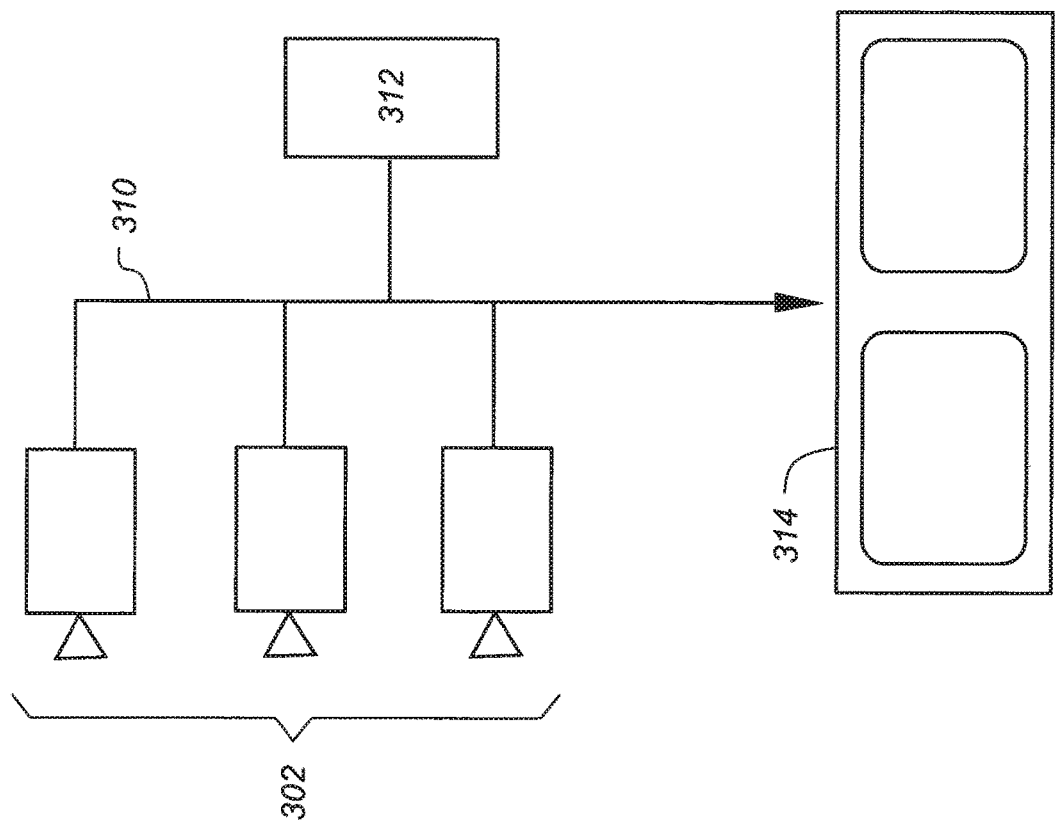
FIG. 3 is a diagram which illustrates a particular configuration constructed in accordance with the invention, namely, a video surveillance system.

FIG. 3 is a diagram which illustrates a particular configuration constructed in accordance with the invention, namely, a video surveillance system. In this case, the signals from multiple cameras 302 are transmitted as streaming sources at relatively low data rates, on the order of 200K to 4 Mbps, with 1 to 24 fps variable frame rates via broadband connection 310. As discussed above, this conserves video server 312 storage requirements, facilitating one hour of storage utilizing only 2 GB of capacity. This information may then be network-accessed by one or more monitoring control systems 314, preferably using multi-screen displays, and optionally including alarms or other features using graphic analysis or other methodologies.

The advantages of this approach are many, in addition to the ability to use existing broadband infrastructures supporting data transfers in the range 1:4 Mbps, the systems may be built at 1/10th cost of conventional HDTV systems. High-quality monitoring is capable, as is direct network connectivity. The use of a generic PC-based server can easily handle a large monitoring application. The resulting configuration improves security, at banks, for example, while reducing mistakes due to human error. Operating efficiency is improved for medical applications, for example, along with reliability and monitoring efficiency (speed). Overall, the system is physically compact.

Figure 4:
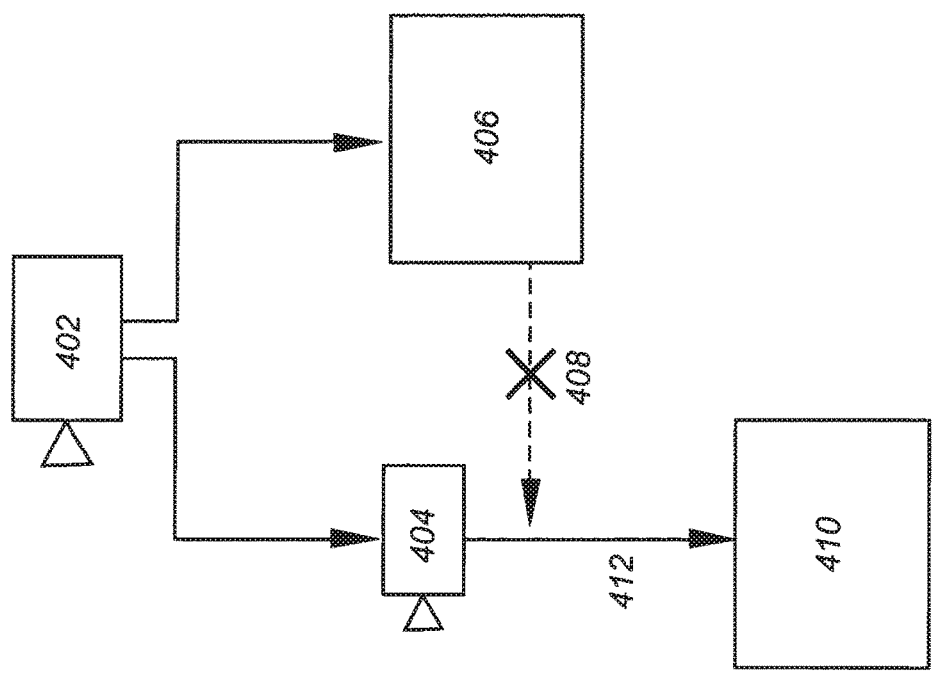
FIG. 4 is a drawing which shows a different particular layout according to the invention, in this a streaming production system.

FIG. 4 is a drawing which shows a different particular layout according to the invention, in this case a streaming production system which may be implemented with Professional-quality equipment. Again, a camera 402 producing HDTV quality video transmits at a relatively low data rate as a streaming source to a program editing facility 410 through a direct connection 412, enabling various operator controls including, but not limited to, frame-by-frame control, variable playback, forward/reverse (bi-directional) playback, and so forth. A decision list is generated on a scene-by-scene basis, with AVI file conversion being used for compatibility with PC non-linear editing. Alternative formats would include, for example, MPEG-4, Windows Media 9, or Divx (which even can be edited, utilizing one of the available software packages for editing. The source material and EDL (Edit Decision List) codes are stored in a streaming server, with the resulting modest requirements facilitating an hour of storage within a Gigabyte of memory (for SDTV at 2 Mbps) or within two Gigabytes of memory (for HDTV at 4 Mbps. The streaming video is output to one or more likely multiple viewing stations, utilizing an even lower data rate of, perhaps, less than two Mbps. Conventional SDTV signals utilizing a compressed DV-type output typically would be provided at 25-50 Mbps. HDTV-type signals utilizing a compressed SDI-type output would be provided at 100-300 Mbps; however, the signal manipulations within the system and before the output stages would utilize the more efficient and compact 4 Mbps files and signal streams.

This system application offers numerous features and advantages over a traditional system, which requires a more traditional recording and editing system 406, and which does not allow a direct connection via path 408. Using the approach described above, results in a dramatic reduction and system cost (under $10.000 vs. $100.000 or more at current prices). Full digital component processing (4:2:2) is achieved without a loss in quality, and excessive hard disk drives are not required for editing; rather, a generic PC is capable of editing the program (10 gigabytes vs. terabytes for traditional HDTV). The advantages includes a reduced HDTV production cost and time without a separate data capture step. The invention is not limited in term so video format or streaming, as all existing and yet to be developed formats may be accommodated.

Figure 5:
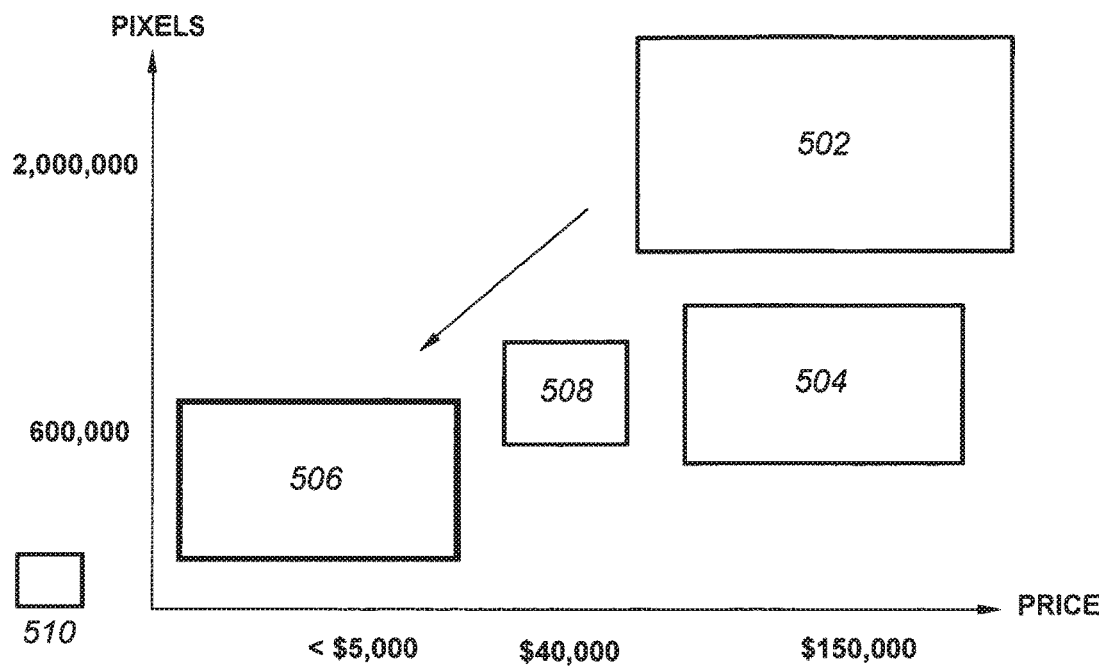
FIG. 5 is a diagram which shows the way in which the instant invention implements HDTV quality video at a very low overall system cost.

FIG. 5 is a diagram which shows the way in which the instant invention implements HDTV quality video at a very low overall system cost. At the high end, an HDTV camera with a format 502 of 16:9 at 1920×1080 pixels uses some 2 million pixels per image as the source, which is reduced at 504 to less than 1 Megapixels or thereabouts due to interlace losses, bandwidth limiting, compression losses and so forth, resulting in an actual resolution of 70 percent of the original. Even so, equipment exhibiting this level of performance currently involves hardware costs of approximately $200,000.

While broadcast quality video 508 (standard definition at 4:3) costs much less, the image quality is reduced dramatically, to a frame size of 720×480 pixels (4:3, 30 fps). According to the invention, however, utilizing a 24 fps scan and proprietary multi-format system at 506, a 24P image at 1024×576 or 1280×720 can be generated having an aspect ratio of 16:9, exhibiting a quality comparable to conventional HDTV broadcast, but at a cost of under $10,000. A typical surveillance image, at 320×240 and <15 fps is shown at 510 for comparison purposes.

For any of these implementations (Professional, Camcorder, Surveillance, or Consumer), a key part of the system resides in the optimization of the entire processing scheme, with an eye towards the end-user quality level. For example, in the case of modem plasma-display units, the capability of the individual unit largely is determined by the physical dimensions of the screen: 32" displays are supplied as capable of 848×477 pixels; 42" displays are supplied as capable of 1024×576 pixels; 50" displays are supplied as capable of 1280×720 pixels. Because multiple tests have demonstrated that "film quality" as measured at the theatrical projection screen only provides approximately 700 lines of resolution (see, for example, A. Kaiser, H. W. Mahler, and R. H. McMann, SMPTE Journal, June, 1985), 1024×576, or at most 1280×720, provides the optimum display quality; 1920×1080 or other higher-pixel-count systems are not required.

Another key feature of the system is the utilization of compression technology. Most origination-quality systems rely on intra-frame compression (such as Motion-JPEG), which is limited to 3:1 or 4:1 for this type of application. Further downstream in the processing and transmission chain, much higher inter-frame-based compression ratios are needed (such as MPEG-2), in order to make signal distribution practical and economical. The instant invention contemplates high compression ratios throughout the process, achieving in excess of 100:1 compression. In this way, the use of "intermediate" formats, such as DVC-PRO or DV-CAM no longer are required. Furthermore, the reduced data rates required for the system eliminates the need for extremely large capacity hard-disk recording capability, enabling editing on most of today's conventional PCs.

However, in order to achieve these kinds of compression ratios without sacrificing quality, the preferred embodiment employs 24 fps signals (which, evidently, saves 20% of the data rate required for a 30 fps signal), and also progressive-scanning (which is over 50% more efficient than compression of interlaced signals). Many compression schemes are available, including, for example, industry standards such as MPEG-4, and proprietary systems such as Microsoft Windows Media 9, Divx, and Wavelet-type compression. The resulting data rates easily are conveyed over conventional distribution paths, such as satellite, cable, and broadcast systems, requiring only 1-2 Mbps for SDTV-type signals, and 6 Mbps for HDTV-type signals.

Figure 6:
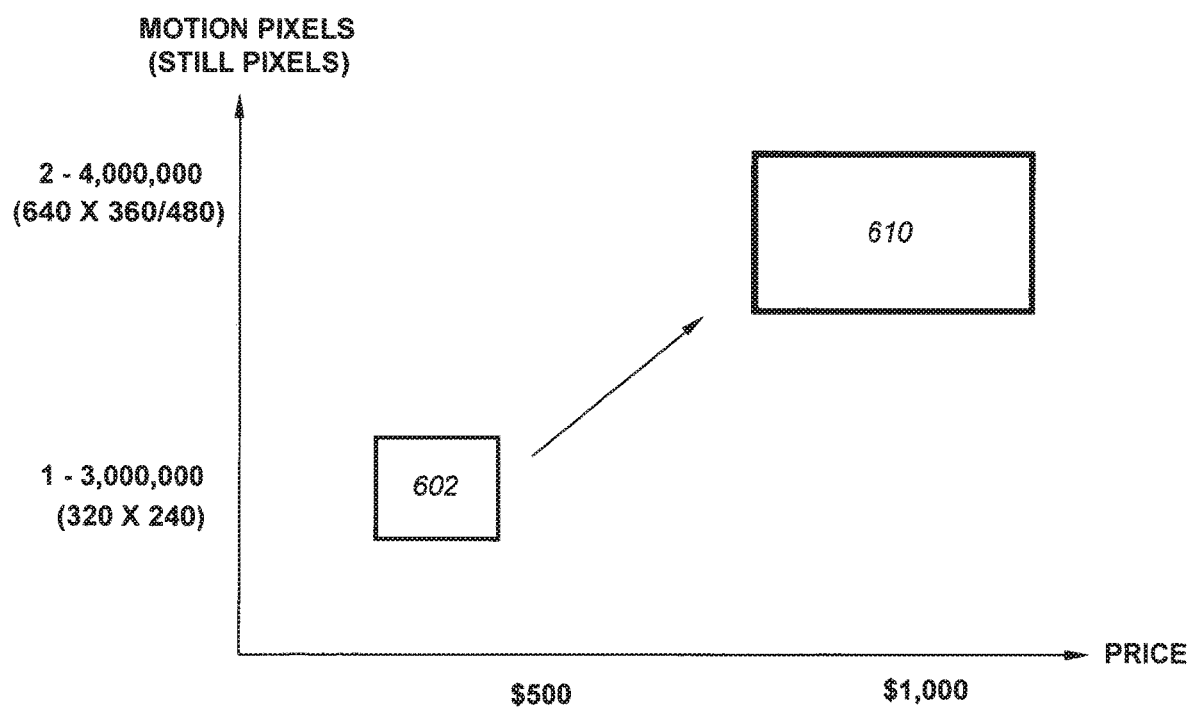
FIG. 6 is a diagram which shows the quality levels provided by the consumer-type implementation of the "Direct Stream Cinema" systems.

As shown in FIG. 6, in Consumer-type applications, it is common to employ digital still camera systems, utilizing high-speed shutters to provide video program sourcing. For example, at a resolution of 320×240 and <15 fps (4:3) the results are limited to relatively low-quality recordings for relatively limited recording times. In addition, many artifacts are imparted to the recordings, such as motion artifacts and picture hesitation or jumps. Photo jpeg compression does not reproduce smooth motion, recording time is limited, and audio quality is poor.

However. consumer cameras are producing increasingly high quality recording. despite their small size and low cost. By employing the techniques disclosed herein, DV-quality recordings for more than one hour are practical, and S-VHS-quality recordings for more than two hours can be achieved. In addition, video editing is simplified, as no step of capturing to the PC is required—editing can proceed directly from camera memory cards or other storage devices (including hard-disk, optical disc, DVD, etc.), and the quality is preserved throughout the process. In addition, the resulting recordings are compatible with various streaming conventions, such as those supported by Microsoft and Real Networks video. This same system of video processing without a step of capturing the signal to the PC applies equally as well to Professional and Camcorder applications.

The reader will appreciate that the practical application of the instant invention has significant implications in many fields. For example, Digital Asset Management systems typically employ highly-compressed "proxies" to convey the content of much less-compressed primary program materials, thereby enabling Edit Decision Lists to be developed from the "proxies" and then used to edit the final program using the primary program material. With the much more efficient signal processing methods provided herein, it is not necessary to create the separate proxies, as the primary signals themselves are provided at much lower data rates than traditionally have been available for these materials, making them suitable for use in a single-step on-line editing application.

The "Direct Stream Cinema System" is based on optimizing the entire signal path, utilizing 4:2:2 color processing and bit rates typically in the range of 1-2 Mbps for SDTV-quality video and 4-6 Mbps for HDTV-quality video. It begins with digitizing and compressing the output of the optical pickup and graphics processor (including appropriate processing, such as noise reduction and resolution enhancement), so that from the onset the data rate is set and then maintained through the internal processing circuitry, recording steps, and through the distribution steps to the receiving terminal device at the user end of the transmission chain. Signal quality is preserved throughout the process, by eliminating the need to decompress a lower-compression signal from a camera, video recorder, or other source device for editing or other purposes, and then re-compressing the signal at a much higher rate for transmission purposes. Thus, there is no distinct "intermediate" format of any kind, as the original video format obtained from the optical pickup or other source device is maintained through the entire path to the receiving terminal device.

Note that, to a certain extent, the resolution sizes and pixels, as well as the prices, and other data are associated with current technology, and are anticipated to vary in time as technology improves and matures. Nevertheless, the inventive approach of applicant will at all times result in a substantial decrease in system cost while preserving the highest possible quality, even at limited bandwidths. Additionally, in all embodiments of the invention, techniques such as pixel interpolation may advantageously be used to further enhance image resolution/quality.

We claim:

1. A method for providing remote access to a video surveillance system comprising:
    converting, at a computing device, a first plurality of video streams into a selected video format in a particular resolution using a given set of temporal and spatial parameters associated with images in each of the first plurality of video streams, wherein each video stream comprises a stream of images captured at one of a plurality of different video sources, wherein each of the plurality of different video sources comprises a camera of the video surveillance system;
    contemporaneously storing at least a subset of the converted video streams in a storage device in a network environment;
    receiving, from a remote computing device remotely located from the video surveillance system, a request to receive one or more specific video streams;
    transmitting one or more of the converted video streams that includes a given video stream, either directly from one or more of the plurality of different video sources or from the storage device, outbound onto a network to be delivered to the remote computing device via a communication channel and in the selected format in the particular resolution, wherein the selected video format is a progressive video format which has a frame rate of less than substantially 24 frames per second, wherein the communication channel traverses at least one external broadband connection between the remote computing device and the network environment; and
    displaying, at the remote computing device, a second plurality of video streams in separate windows using another set of temporal and spatial parameters to display images of the second plurality of video streams in each of the separate windows, wherein the second plurality of video streams includes the given video stream.

2. The method of claim 1, further comprising:
displaying, at the remote computing device, the given video stream of the plurality of video streams transmitted over the communication channel contemporaneously with the displaying at the computing device.

3. The method of claim 1, further comprising:
displaying, at the remote computing device, the given video stream of the plurality of video streams transmitted over the communication channel after the storing of the converted video streams.

4. The method of claim 1, further comprising displaying only the one or more requested video streams on the remote computing device.

5. A method for providing remote access to a video surveillance system, comprising the steps of:
receiving video images at a personal computer based system from a plurality of video sources, wherein each of the plurality of video sources comprises a camera of the video surveillance system;
displaying one or more of the received video images in separate windows on a personal computer based display device, using a first set of temporal and spatial parameters;
converting one or more of the video source images into a selected video format in a particular resolution, using a second set of temporal and spatial parameters associated with images;
contemporaneously storing at least a subset of the converted images in a storage device in a network environment;
providing a communications link to allow an external viewing device to access the storage device;
receiving, from a remote viewing device located remotely from the video surveillance system, a request to receive one or more specific streams of the video images; and
transmitting, either directly from one or more of the plurality of video sources or from the storage device outbound on the communication link to the remote viewing device, and in the selected video format in the particular resolution, the selected video format being a progressive video format which has a frame rate of less than substantially 24 frames per second using a third set of temporal and spatial parameters associated with images, a version or versions of one or more of the video images to the remote viewing device, wherein the communication link traverses at least one external broadband connection between the remote computing device and the network environment.

6. The method of claim 5, wherein the broadband connection has a bandwidth of 2-6 Megabits per second (Mbps).

7. The method of claim 5, further comprising displaying only the one or more requested specific streams of the video images on the remote computing device.

8. The method of claim 7, wherein the displaying of only the one or more requested specific streams of the video images on the remote computing device is contemporaneous with the displaying on the personal computer based display device and the storing in the storage device.

9. The method of claim 7, wherein the displaying of only the one or more requested specific streams of the video images on the remote computing device is conducted subsequent to the displaying on the personal computer based display device and the storing in the storage device.

10. The method of claim 5, wherein the remote computing device and the network environment communicate through the Internet.

11. A method for providing remote access to a video surveillance system, comprising the steps of:
receiving video images at a personal computer based system from a plurality of video sources, wherein each of the plurality of video sources comprises a camera of the video surveillance system;
displaying one or more of the received video images in separate windows on a personal computer based display device, using a first set of temporal and spatial parameters;
converting one or more of the video source images into a selected video format in a particular resolution, using a second set of temporal and spatial parameters associated with images;
contemporaneously storing at least a subset of the converted images in a storage device in a network environment;
providing a communications link to allow an external viewing device to access the storage device;
receiving, from a remote viewing device located remotely from the video surveillance system, a request to receive one or more specific streams of the video images; and
transmitting, either directly from one or more of the plurality of video sources or from the storage device outbound on the communication link that includes at least one network segment traversing the Internet to the remote viewing device, and in the selected video format in the particular resolution, the selected video format being a progressive video format which has a frame rate of less than substantially 24 frames per second using a third set of temporal and spatial parameters associated with images, a version or versions of one or more of the video images to the remote viewing device.

12. The method of claim 11, wherein the communication link has a bandwidth of 2-6 Megabits per second (Mbps).

13. The method of claim 11, further comprising displaying only the one or more requested specific streams of the video images on the remote computing device.

14. The method of claim 13, wherein the displaying of the one or more requested specific streams is contemporaneous with the displaying on the personal computer based display device and the storing in the storage device.

15. The method of claim 13, wherein the displaying of the one or more requested specific streams is conducted subsequent to the displaying on the personal computer based display device and the storing in the storage device.

* * * * *